(12) United States Patent
Lin

(10) Patent No.: US 8,060,985 B2
(45) Date of Patent: Nov. 22, 2011

(54) HINGE STRUCTURE WITH CHANGEABLE FRICTIONAL FACES

(75) Inventor: Chia-Han Lin, Sinjhuang (TW)

(73) Assignee: Jarllytec Co., Ltd., Sinjhuang (TW)

( * ) Notice: Subject to any disclaimer, the term of this patent is extended or adjusted under 35 U.S.C. 154(b) by 478 days.

(21) Appl. No.: 12/248,936

(22) Filed: Oct. 10, 2008

(65) Prior Publication Data

US 2009/0151116 A1   Jun. 18, 2009

(30) Foreign Application Priority Data

Dec. 18, 2007  (TW) .............................. 96148574 A

(51) Int. Cl.
*E05D 11/06* (2006.01)
(52) U.S. Cl. ........................................... 16/374; 16/342
(58) Field of Classification Search ............ 16/374–376, 16/386, 387, 337, 342, 343, 348, 357
See application file for complete search history.

(56) References Cited

U.S. PATENT DOCUMENTS

| | | | |
|---|---|---|---|
| 6,671,929 B1 * | 1/2004 | Lu .................................. | 16/342 |
| 6,748,625 B2 * | 6/2004 | Lu .................................. | 16/285 |
| 6,804,859 B2 * | 10/2004 | Lu et al. .......................... | 16/342 |
| 6,820,307 B2 * | 11/2004 | Lu .................................. | 16/342 |
| 7,513,014 B2 * | 4/2009 | Lin ................................. | 16/374 |

FOREIGN PATENT DOCUMENTS

CN          M304197          1/2007

* cited by examiner

*Primary Examiner* — William L. Miller
(74) *Attorney, Agent, or Firm* — Guice Patents PLLC

(57) ABSTRACT

The present invention discloses a hinge structure with changeable frictional faces, comprising a spindle socketingly disposed with a first enclosing part and a second enclosing part with the openings of the first and second enclosing parts pointing to the same direction to change the frictional face for torsion from the second enclosing face to the first enclosing part and thus to extend the service life and further to form a frictional face with four steps of different torsions to meet the demands of customers.

12 Claims, 9 Drawing Sheets

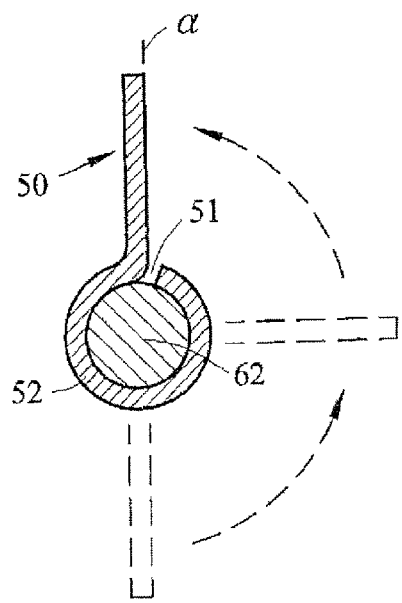
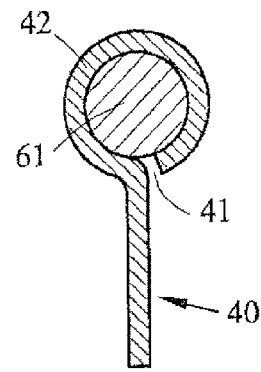
FIG. 7C  FIG. 7D
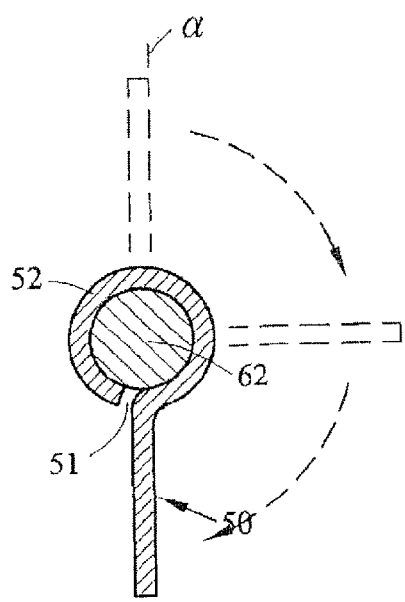
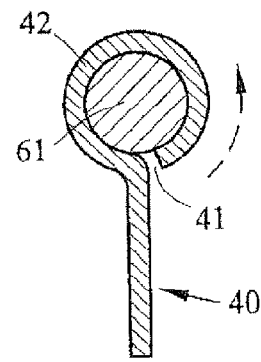
FIG. 7E  FIG. 7F

HINGE STRUCTURE WITH CHANGEABLE FRICTIONAL FACES

FIELD OF THE INVENTION

The present invention relates to a hinge structure with changeable frictional faces and in particular to a hinge structure with enclosing parts.

BACKGROUND OF THE INVENTION

"Hinge Structure (11)," developed by the present inventor, is disclosed in the ROC Patent No. M304197 on Jan. 1, 2007. The invention mainly involves disposing two oppositely arranged sheathing parts (2) onto the shaft-connecting part (1), and when the two sheathing parts (2) rotate jointly with the shaft (11), the torsion difference generated by a bushing (2) with respect to the shaft (11) can be balanced by the torsion difference generated by the other oppositely arranged sheathing part (2) with respect to the shaft (11), such that the balance of torsion can be maintained.

In a conventional art, when the shaft-connecting part (1) is in rotation, the two sheathing parts (2) should form frictional faces for joint rotation on the shaft (11). If the frictional face can be replaced, the hinge structure's service life can be extended. Consequently, there is still room for improvement in the design of hinge devices.

SUMMARY OF THE INVENTION

The primary object of the present invention is to provide a hinge structure with changeable frictional faces, comprising a spindle socketingly disposed with a first enclosing part and a second enclosing part with the frictional face for torsion able to be changed from the second enclosing face to the first enclosing part.

The advantage provided by the present invention lies in the fact that the service life can be extended by changing the frictional face for torsion from the second enclosing face to the first enclosing part.

Another advantage provided by the present invention lies in the fact that the frictional face for torsion is changed from the second enclosing face to the first enclosing part and a frictional face with four steps of different torsions is formed to meet the demands of customers.

A preferred embodiment technology of a hinge structure with changeable frictional faces according to the present invention comprises: a spindle having a first end portion, a second end portion, and a stop portion; a first enclosing part socketingly disposed onto the first end portion of the spindle and having an opening and a protrusion; and a second enclosing part socketingly disposed onto the second end portion of the spindle and having an opening and a protrusion, the openings of the first and second enclosing parts pointing to the same direction; wherein when the second enclosing part rotates from its initial position to abut against the stop portion, the protrusion of the first enclosing part abuts against the stop portion and thus restrict the rotation of the spindle, and a low-torsion frictional face is formed by the rotation of the second enclosing part upon the second end portion of the spindle; when the second enclosing part abutting against the stop portion rotates to α point, the protrusion of the second enclosing part pushes the stop portion and thus prompts the spindle to rotate jointly, and a high-torsion frictional face is formed by the rotation of the first end portion of the spindle within the first enclosing part; when the second enclosing part rotates from α point back to the stop portion, the second enclosing part holds tightly the second end portion of the spindle and thus prompt the spindle to rotate jointly, and a low-torsion frictional face is formed by the rotation of the first end portion of the spindle within the first enclosing part; when the second enclosing part rotates from the stop portion back to its initial position, the protrusion of the first enclosing part abuts against the stop portion of the spindle and thus restrict the rotation of the spindle, and a high-torsion frictional face is formed by the rotation of the second enclosing part upon the second end portion of the spindle.

A preferred embodiment technology of a hinge structure with changeable frictional faces according to the present invention comprises: a spindle having a first end portion, a second end portion, and a stop portion; a first enclosing part socketingly disposed onto the first end portion of the spindle and having an opening; and a second enclosing part socketingly disposed onto the second end portion of the spindle and having an opening, the openings of the first and second enclosing parts pointing to the same direction; wherein when the second enclosing part rotates from its initial position to abut against the stop portion, the first enclosing part abuts against the stop portion and thus restrict the rotation of the spindle, and also a frictional face is formed by the rotation of the second enclosing part upon the second end portion of the spindle; when the second enclosing part abutting the stop portion rotates to α point, the second enclosing part pushes the stop portion and thus prompts the spindle to rotate jointly, and also a frictional face is formed by the rotation of the first end portion of the spindle within the first enclosing part; when the second enclosing part rotates from α point back to the stop portion, the second enclosing part holds tightly the second end portion of the spindle and thus prompts the spindle to rotate jointly, and also a frictional face is formed by the rotation of the first end portion of the spindle within the first enclosing part; when the second enclosing part rotates from the stop portion back to its initial position, the first enclosing part abuts against the stop portion of the spindle and thus restrict the rotation of the spindle, and also a frictional face is formed by the rotation of the second enclosing part on the second end portion of the spindle.

A preferred embodiment technology of a hinge structure with changeable frictional faces according to the present invention comprises: a first enclosing part having an opening; a second enclosing part has an opening, the openings of the a first enclosing part and a second enclosing part pointing to the same direction; and a spindle having a first end portion, a second end portion, and a stop portion, the first end portion being socketingly disposed onto the first enclosing part, the second end portion being socketingly disposed onto the second enclosing part, and the stop portion being positioned between the first and second enclosing parts; wherein when the second enclosing part rotates from its initial position to α point, the first enclosing part holds tightly the first end portion of the spindle and thus restrict the rotation of the spindle, and also a frictional face is formed by the rotation of the second enclosing part on the second end portion of the spindle; wherein when the second enclosing part rotates from α point back to its initial position, the second enclosing part holds tightly the second end portion of the spindle to prompt the spindle to rotate jointly, and also a frictional face is formed by the rotation of the first end portion of the spindle within the first enclosing part.

BRIEF DESCRIPTION OF THE DRAWINGS

The present invention can be more fully understood by reference to the following description and accompanying drawings, in which:

FIG. 7C is an illustrative movement of FIG. 7A;

FIG. 7D is an illustrative movement of FIG. 7B;

FIG. 7E is another illustrative movement of FIG. 7A;

FIG. 7F is another illustrative movement of FIG. 7B; and

DETAILED DESCRIPTION OF THE INVENTION

Figure 1:
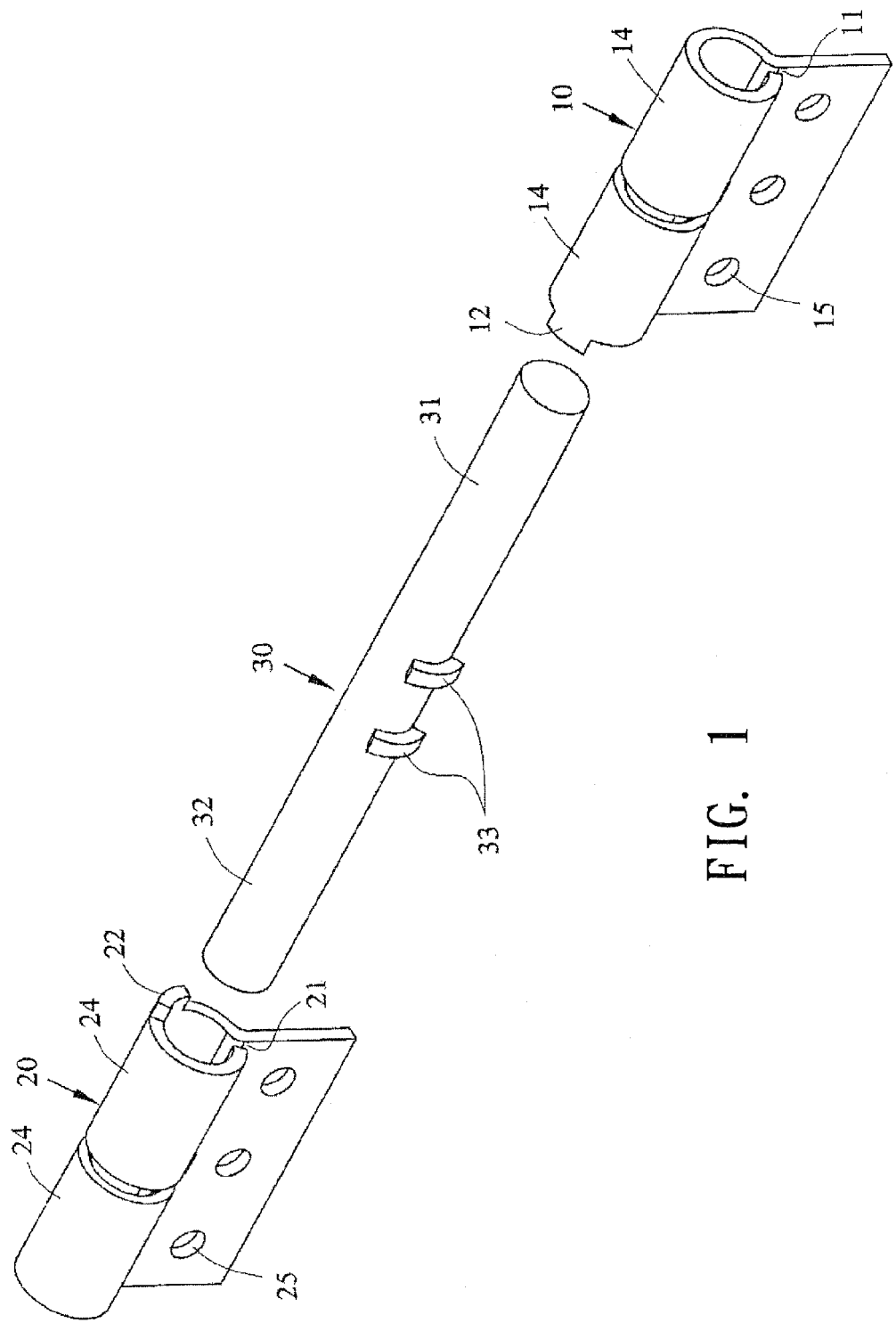
FIG. 1 is an exploded perspective view of a preferred embodiment according to the present invention.
Figure 2:
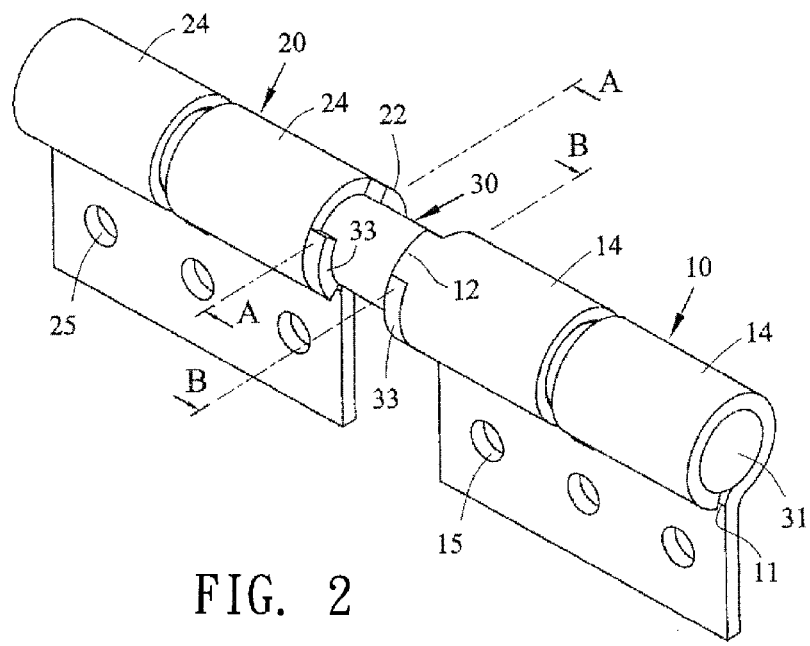
FIG. 2 is a perspective view of a preferred embodiment according to the present invention.
Figure 2A:
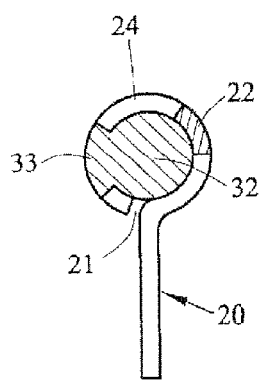
FIG. 2A is the cross-sectional view taken through the A-A line in FIG. 2.
Figure 2B:
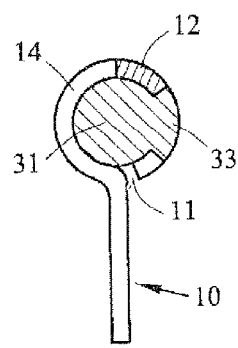
FIG. 2B is the cross-sectional view taken through the B-B line in FIG. 2.
Figure 3:
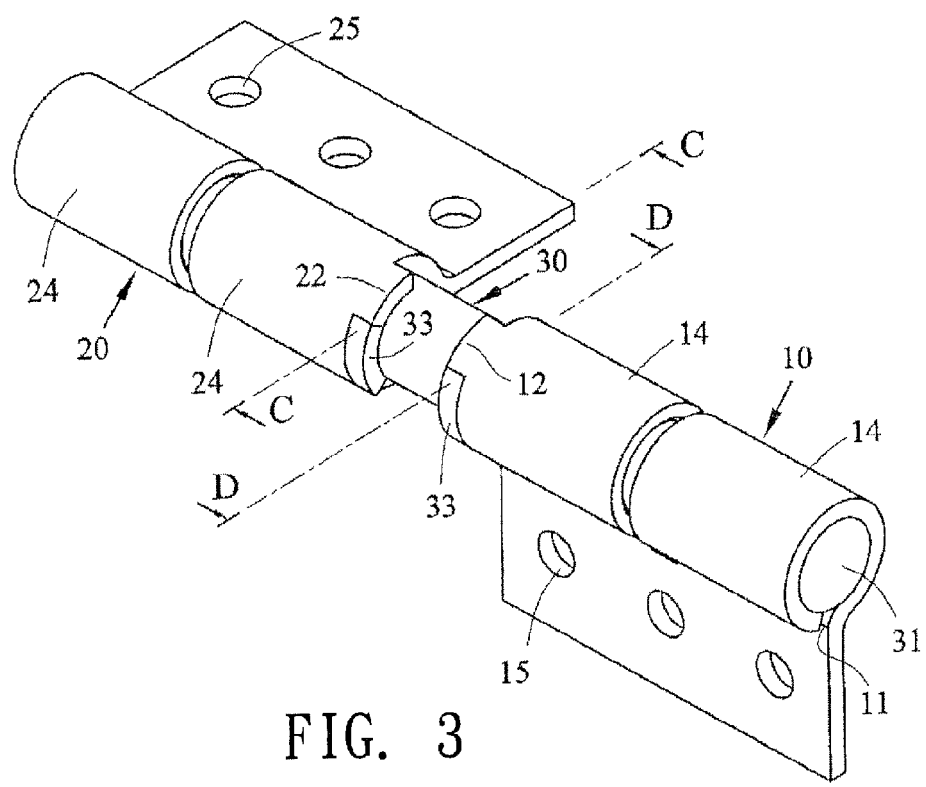
FIG. 3 is an illustrative movement of the present invention.
Figures 3A, 3B:
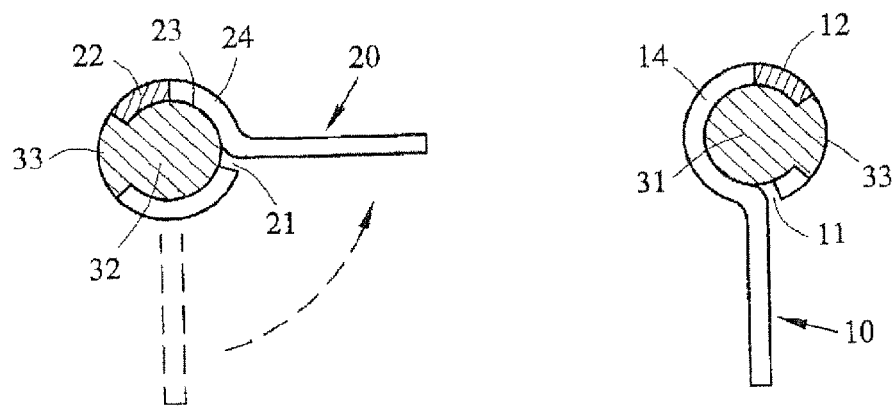
FIG. 3A is the cross-sectional view taken through the C-C line in FIG. 3.
FIG. 3B is the cross-sectional view taken through the D-D line in FIG. 3.

With reference to FIGS. 1 to 6, a preferred embodiment of a hinge structure according to the present invention may be disposed between the base body and cover body of a portable electronic device (not shown), comprising a first enclosing part 10, a second enclosing part 20, and a spindle 30, wherein the spindle 30 has a first end portion 31, a second end portion 32, and a stop portion 33; the first enclosing part 10 is socketingly disposed onto the first end portion 31 of the spindle 30 and has an opening 11 and a protrusion 12; the second enclosing part 20 is socketingly disposed onto the second end portion 32 of the spindle 30 and has an opening 21 and a protrusion 22, the openings 11, 21 of the first and second enclosing parts 10, 20 pointing to the same direction. The stop portion 33 can have a first stopping element selectively engaging the first enclosing part and a second stopping element selectively engaging the second enclosing part. The first stopping element and the second stopping element can be spaced apart and positioned in a same orientation on an exterior surface of the spindle.

With reference to FIGS. 2, 2A, 2B, 3, 3A, and 3B, when the second enclosing part 20 rotates from an initial position to a middle position abutting against the stop portion 33, the protrusion 12 of the first enclosing part 10 abuts against the stop portion 33 and thus restrict the rotation of the spindle 30. The second enclosing part 20 rotates upon the second end portion 32 of the spindle 30 and forms a frictional face 23. Also, the rotation direction of the second enclosing part 20 is identical to the enclosing direction. Under the presence of the opening 21, the frictional face 23 formed by the rotation of second enclosing part 20 upon the second end portion 32 is a low-torsion frictional face.

Figure 4:
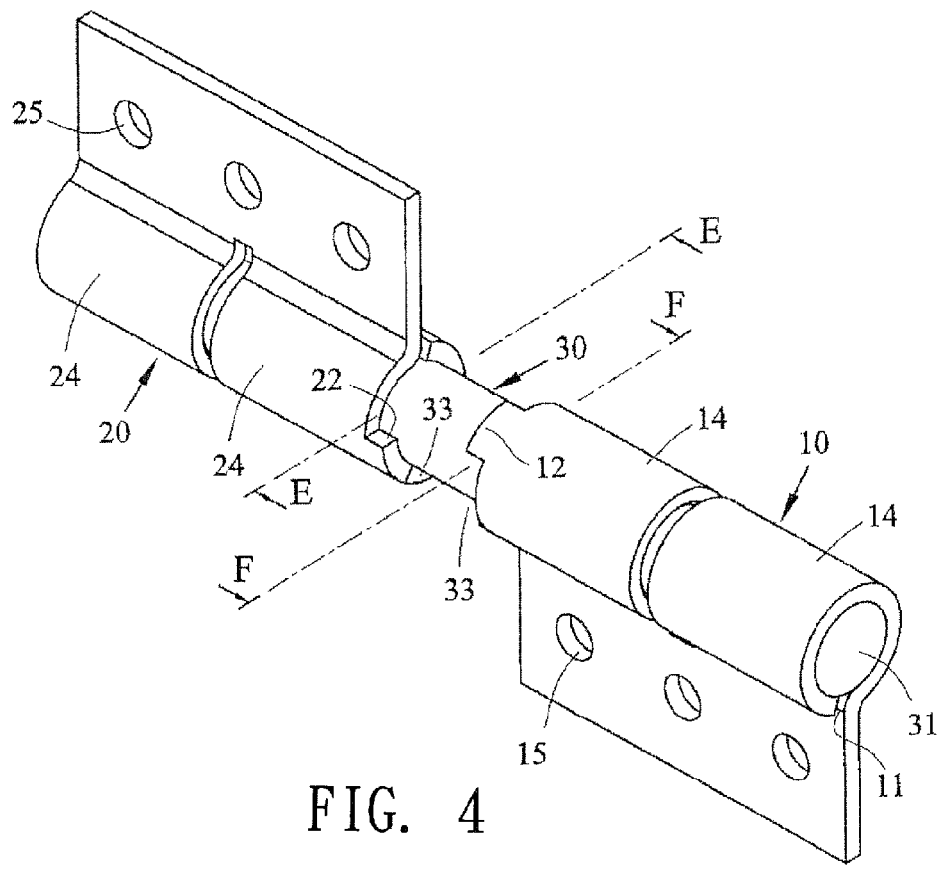
FIG. 4 is a further illustrative movement of the present invention.
Figure 4A:
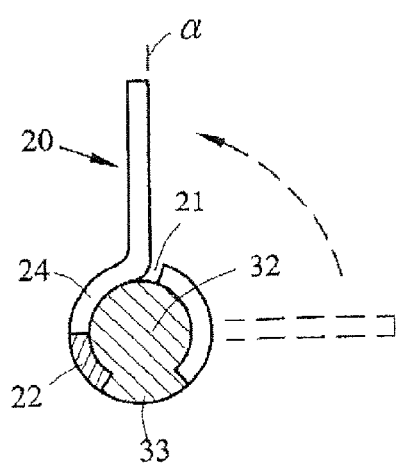
FIG. 4A is the cross-sectional view taken through the E-E line in FIG. 4.
Figure 4B:
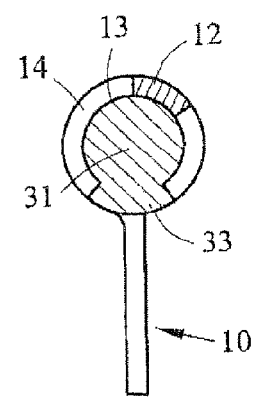
FIG. 4B is the cross-sectional view taken through the F-F line in FIG. 4.

With reference to FIGS. 4, 4A, and 4B, when the second enclosing part 20 abutting against the stop portion 33 rotates to a point at an end position, the protrusion 22 of the second enclosing part 20 pushes the stop portion 33 and thus prompts the spindle 30 to rotate jointly. Consequently, the first end portion 31 of the spindle 30 rotates within the first enclosing part 10 to form a frictional face 13. Also, the rotation direction of the spindle 30 is identical to the enclosing direction of first enclosing part 10, and the frictional face 13 formed by the rotation of the first end portion 31 within the first enclosing part 10 is a high-torsion frictional face.

Figure 5:
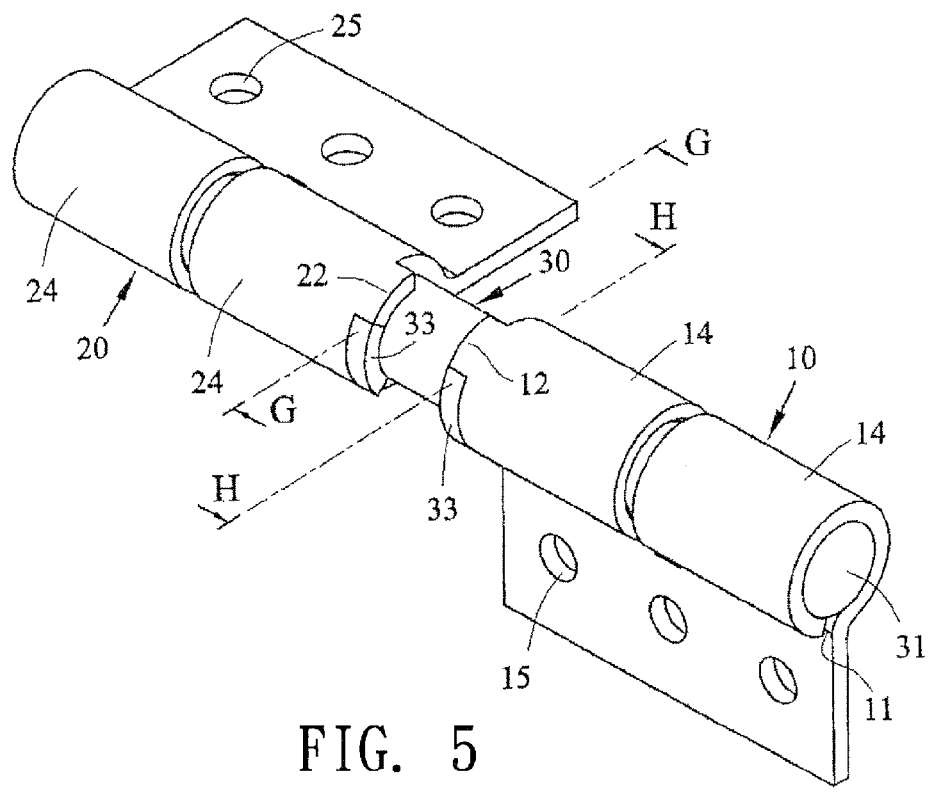
FIG. 5 is another illustrative movement of the present invention.
Figure 5A:
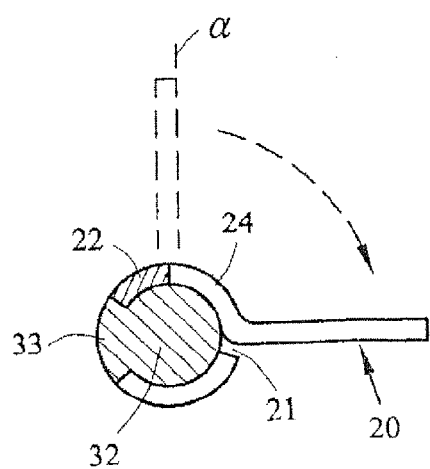
FIG. 5A is the cross-sectional view taken through the G-G line in FIG. 5.
Figure 5B:
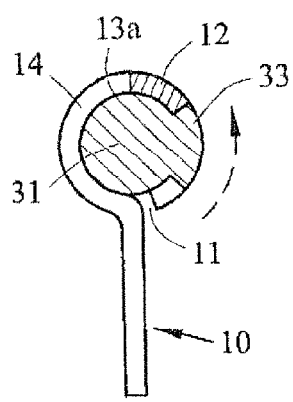
FIG. 5B is the cross-sectional view taken through the H-H line in FIG. 5.

With reference to FIGS. 5, 5A, and 5B, when the second enclosing part 20 rotates from the α point at the end position back to middle position, the second enclosing part 20 holds tightly the second end portion 32 of the spindle 30, and thus prompts the spindle 30 to rotate jointly. Consequently, the first end portion 31 of the spindle 30 rotates within the first enclosing part 10 to form a frictional face 13a. Also, the rotation direction of the spindle 30 is opposite to the enclosing direction of first enclosing part 10. Under the direction of the opening 11, the frictional face 13a formed by the rotation of the first end portion 31 within the first enclosing part 10 is a low-torsion frictional face.

Figure 6:
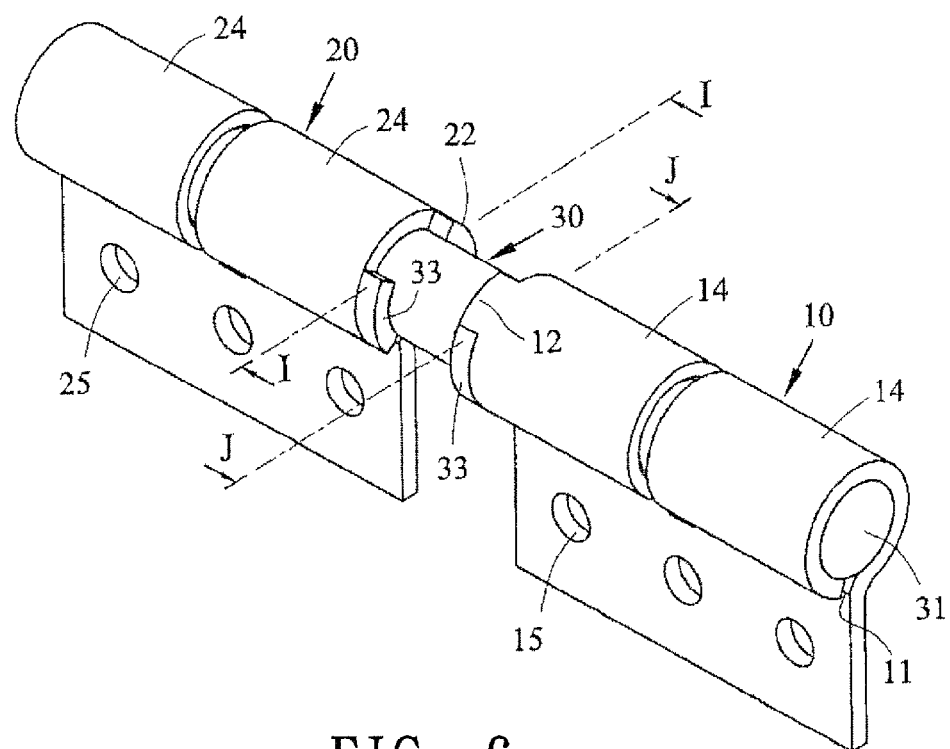
FIG. 6 is a further another illustrative movement of the present invention.
Figure 6A:
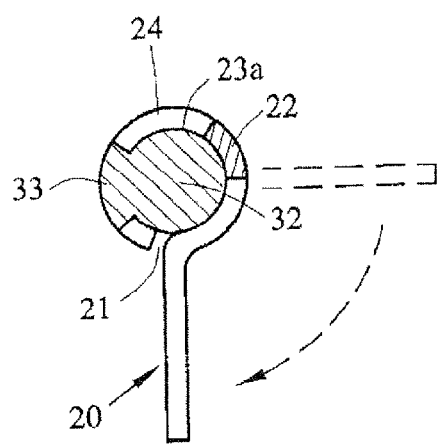
FIG. 6A is the cross-sectional view taken through the I-I line in FIG. 6.
Figure 6B:
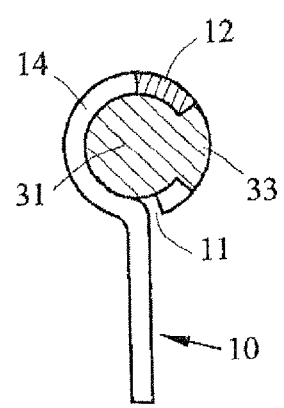
FIG. 6B is the cross-sectional view taken through the J-J line in FIG. 6.

With reference to FIGS. 6, 6A, and 6B, when the second enclosing part 20 rotates from the stop portion 33 at the middle position back to the initial position, the protrusion 12 of the first enclosing part 10 abuts against the stop portion 33 of the spindle 30 and thus restrict the rotation of the spindle 30, and the second enclosing part 20 rotates upon the second end portion 32 of the spindle 30 to form a frictional face 23a. Also, the rotation direction of the second enclosing part 20 is opposite to the enclosing direction and the frictional face 23a formed by the rotation of the second enclosing part 20 upon the second end portion 32 is a high-torsion frictional face.

The preferred embodiment of a hinge structure according to the present invention may also be achieved as follows: For example, the stop portion 33 may comprise a protrusion or two protrusions, and further the stop portion 33 may also comprise a positioning pin or two positioning pins; the first enclosing part 10 may comprise an enclosing piece 14 or two enclosing pieces 14, and also the second enclosing part 20 may comprise an enclosing piece 24 or two enclosing pieces 24. The rotation range of the second enclosing part 20 from the initial position to the stop portion 33 is preferable to be 90 degrees, or 80 to 90 degrees. Also, the rotation degree from abutting the stop portion 33 to α point is preferable to be 90 degrees, or 90 to 100 degrees. The first enclosing part 10 may comprise at least two fixed holes 15, and also the second enclosing part 20 may comprise at least two fixed holes 25.

As described above, in the preferred embodiment of a hinge structure according to the present invention, the frictional face may be changed from the second enclosing part 20 to the first enclosing part 10 and then changed from the first enclosing part 10 back to the second enclosing part 20 to extend its service life and provide frictional faces to generate four steps of torsion to meet the demand of customers.

For example, when the present invention is embodied in a portable electronic device, the second enclosing part 20 is fixed on its cover body (not shown). Consequently, when the cover body is lift open near the 90-degree position, the frictional face 23 formed by the second enclosing part 20 is a low-torsion frictional face and thus the cover body can be easily opened. When the cover body is lift over the 90-degree position, the frictional face 13 formed by the first enclosing part 10 is a high-torsion frictional face and thus the supporting force is sufficient to position the cover body; when the cover body is required to return after being lift over the 90-degree position, the frictional face 13a formed by the first enclosing part 10 is a low-torsion frictional face, such that the cover body can be easily positioned or returned to near the 90-degree position; when the cover body is required to return after being lift under the 90-degree position, the frictional face 23a formed by the second enclosing part 20 is a high-torsion frictional face with a sufficient supporting force, such that when the cover body is being flipped close, the cover body will not strike the base body (not shown) under its own weight and torque.

Figure 7:
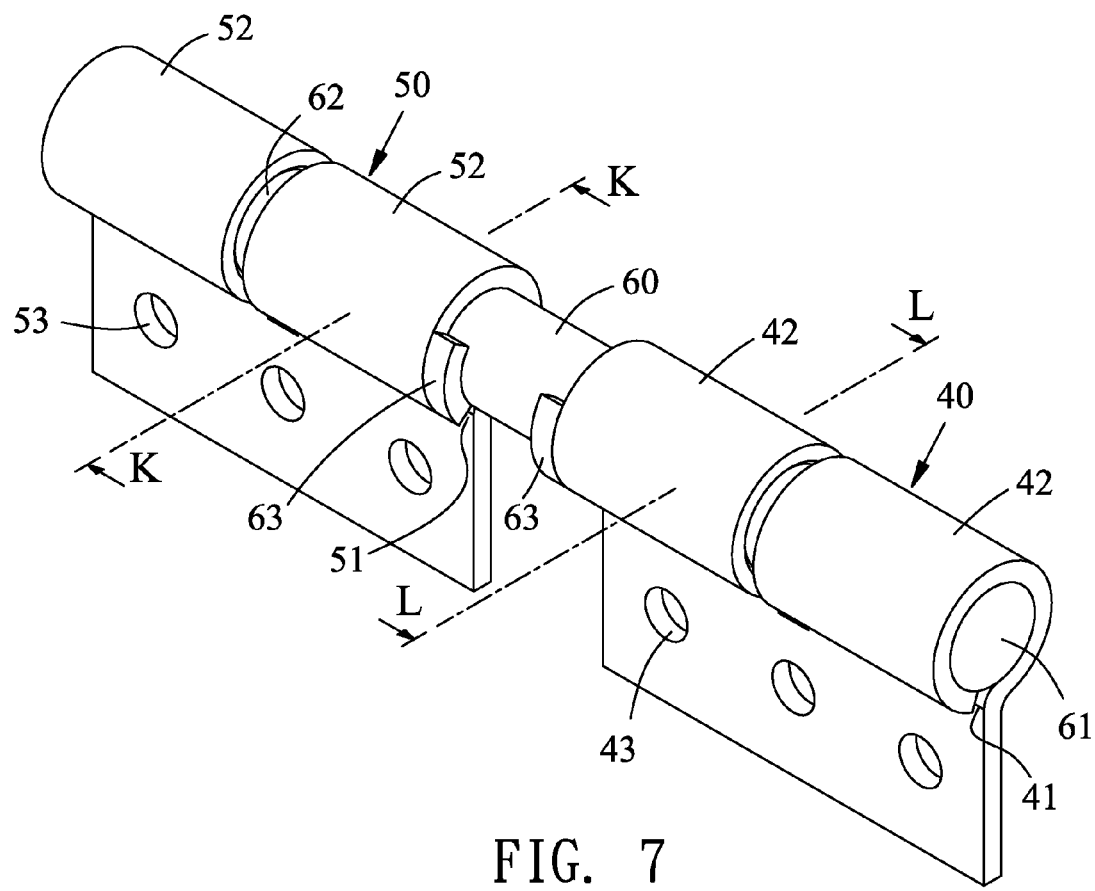
FIG. 7 is a perspective view of the second embodiment according to the present invention.
Figure 7A:
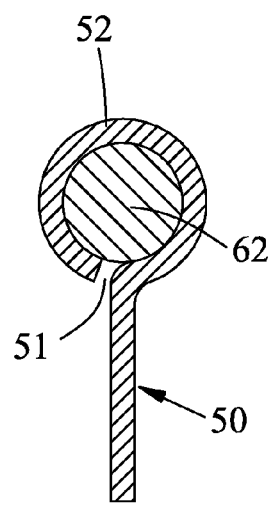
FIG. 7A is the cross-sectional view taken through the K-K line in FIG. 7.
Figure 7B:
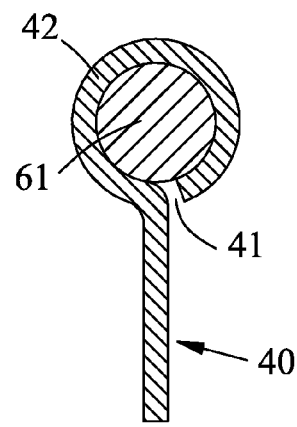
FIG. 7B is the cross-sectional view taken through the L-L line in FIG. 7.

With reference to FIG. 7, the second embodiment of a hinge structure according to the present invention may be disposed between the base body and cover body (not shown) of an electronic device, comprising a first enclosing part 40, a second enclosing part 50, and a spindle 60; wherein the first enclosing part 40 has an opening 41, the second enclosing part 50 has an opening 51, the openings 41, 51 of the first and second enclosing parts 40 and 50 pointing to the same direction; the spindle 60 has a first end portion 61, a second end portion 62, and a stop portion 63; the first end portion 61 is socketingly disposed onto the first enclosing part 40, the second end portion 62 is socketingly disposed onto the second enclosing part 50, and the stop portion 63 is positioned between the first and second enclosing parts 40 and 50 to prevent the spindle 60 from flying out during rotation.

With reference to FIGS. 7A, 7B, 7C, and 7D, when the second enclosing part 50 rotates from its initial position to α point, the first enclosing part 40 holds tightly the first end portion 61 of the spindle 60 and thus restrict the rotation of the spindle 60, and also a frictional face is formed by the rotation of the second enclosing part 50 rotates on the second end portion 62 of the spindle 60.

With reference to FIGS. 7E and 7F, when the second enclosing part 50 rotates from α point back to its initial position, the second enclosing part 50 holds tightly the second end portion 62 of the spindle 60, and thus prompts the spindle 60 to rotate jointly. Also, a frictional face is formed by the rotation of the first end portion 61 of the spindle 60 within the first enclosing part 40.

The second preferred embodiment of a hinge structure according to the present invention may also be achieved as follows:

For example, the rotation range of the second enclosing part 50 from the initial position to α point is preferable to be between 170 and 190 degrees.

The first enclosing part 40 comprises at least two fixed holes 43, and also the second enclosing part 50 comprises at least two fixed holes 53.

The first enclosing part 40 may comprise two enclosing pieces 42, and also the second enclosing part 50 may comprise two enclosing pieces 52.

Figure 8:
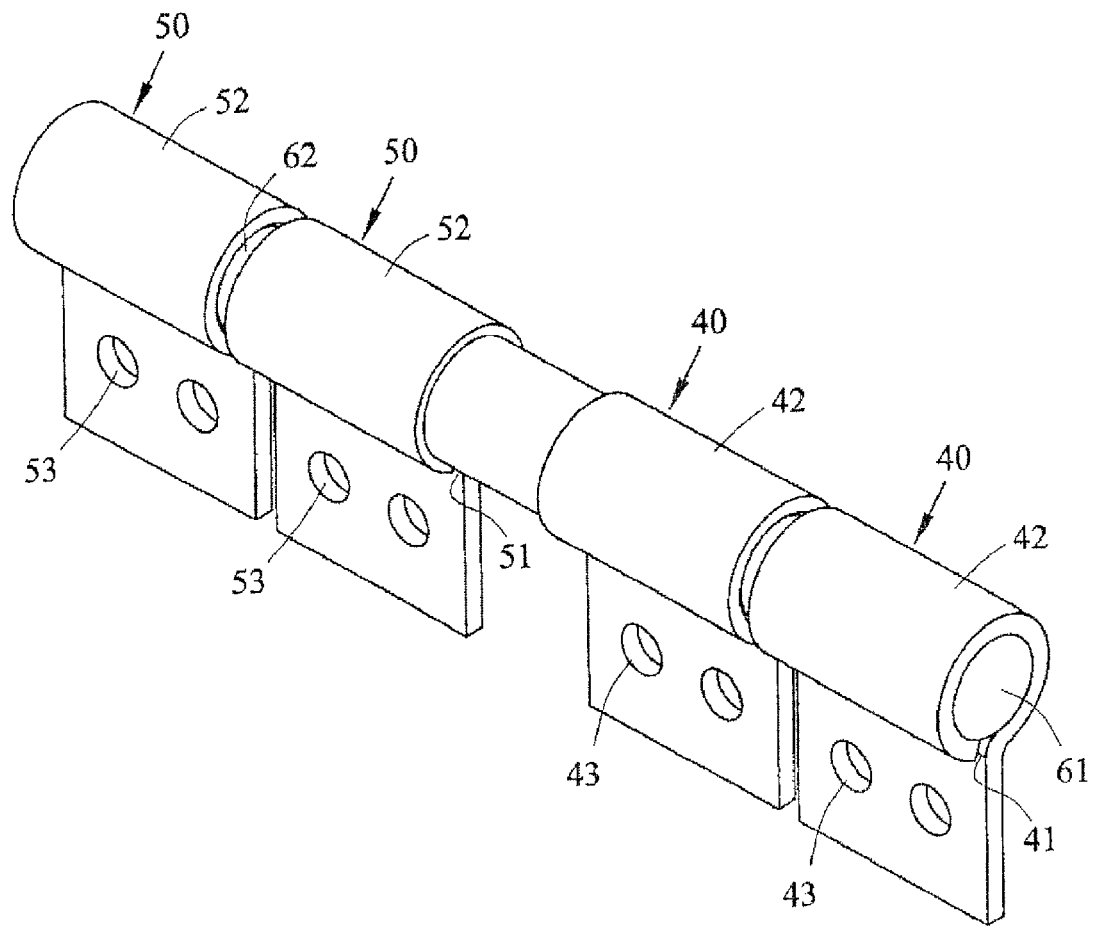
FIG. 8 is a perspective view of the third embodiment according to the present invention.

With reference to FIG. 8, in the third embodiment of the present invention, the first end portion 61 of the spindle 60 may be socketingly disposed with two first enclosing parts 40, and the second end portion 62 of the spindle 60 may be socketingly disposed with two second enclosing parts 50. As described earlier, in the preferred embodiment according to the present invention, the frictional face may be changed from the second enclosing part 50 to the first enclosing part 40 to extend the service life.

While the invention has been described with reference to the a preferred embodiment thereof, it is to be understood that modifications or variations may be easily made without departing from the spirit of this invention, which is defined by the appended claims.

What is claimed is:

1. A hinge structure with changeable frictional faces, comprising:
    a spindle having a first end portion, a second end portion, and a stop portion located between the first end portion and the second end portion, the stop portion having a first stopping element and a second stopping element;
    a first enclosing part socketingly disposed onto the first end portion of the spindle and having an opening and a protrusion; and
    a second enclosing part socketingly disposed onto the second end portion of the spindle and having an opening and a protrusion, the openings of the first and second enclosing parts are oriented in a same direction;
    wherein, when the second enclosing part rotates from an initial position to a middle position abutting against the stop portion, the protrusion of the first enclosing part abuts against the first stopping element of the stop portion restricting the rotation of the spindle, and a low-torsion frictional face is formed by the rotation of the second enclosing part upon the second end;
    wherein, when the second enclosing part abutting against the stop portion rotates to an end position, the protrusion of the second enclosing part pushes the second stopping element of the stop portion and rotates the spindle with the second enclosing part, and a high-torsion frictional face is formed by the rotation of the first end portion of the spindle within the first enclosing part;
    wherein, when the second enclosing part rotates from the end position back to the middle position, the second enclosing part holds tightly the second end portion of the spindle and rotates the spindle with the second enclosing part, and a low-torsion frictional face is formed by the rotation of the first end portion of the spindle within the first enclosing part;
    wherein, when the second enclosing part rotates from the stop portion back to its initial position, the protrusion of the first enclosing part abuts against the first stopping element of the stop portion of the spindle restricting the rotation of the spindle, and a high-torsion frictional face is formed by the rotation of the second enclosing part upon the second end portion of the spindle.

2. The hinge structure with changeable frictional faces as defined in claim 1, wherein the stopping elements are selected from a group consisting of two protrusions and two positioning pins.

3. The hinge structure with changeable frictional faces as defined in claim 1, wherein the first enclosing part has two enclosing pieces and the second enclosing part has two enclosing pieces.

4. The hinge structure with changeable frictional faces as defined in claim 1, wherein the rotation range of the second enclosing part from the initial position to the middle position is to be 90 degrees.

5. The hinge structure with changeable frictional faces as defined in claim 1, wherein the rotation degree from the middle position to the end position is 90 degrees.

6. The hinge structure with changeable frictional faces as defined in claim 1, wherein the first enclosing part has at least two fixed holes and the second enclosing part has at least two fixed holes.

7. The hinge structure with changeable frictional faces as defined in claim 1, wherein the first stopping element and the second stopping element are spaced apart, positioned in a same orientation, and axially aligned on an exterior surface of the spindle.

8. A hinge structure with changeable frictional faces, comprising:
   a first enclosing part having an opening;
   a second enclosing part has an opening, the openings of the first enclosing part and the second enclosing part are oriented in a same direction; and
   a spindle having a first end portion, a second end portion, and a stop portion, the stop portion having a first stopping element selectively engaging the first enclosing part and a second stopping element selectively engaging the second enclosing part, the first end portion being socketingly disposed onto the first enclosing part, the second end portion being socketingly disposed onto the second enclosing part, and the stop portion being positioned between the first and second enclosing parts;
   wherein, when the second enclosing part rotates from an initial position to an end position, the first enclosing part holds tightly the first end portion of the spindle restricting the rotation of the spindle, and a frictional face is formed by the rotation of the second enclosing part on the second end portion of the spindle;
   wherein, when the second enclosing part rotates from the end position back to the initial position, the second enclosing part holds tightly the second end portion of the spindle and the spindle rotates with the second enclosing part, and a frictional face is formed by the rotation of the first end portion of the spindle within the first enclosing part;
   wherein the first stopping element and the second stopping element are spaced apart, positioned in a same orientation, and axially aligned on an exterior surface of the spindle.

9. The hinge structure with changeable frictional faces as defined in claim 8, wherein the first enclosing part has two enclosing pieces and the second enclosing part has two enclosing pieces.

10. The hinge structure with changeable frictional faces as defined in claim 8, wherein the first end portion of the spindle is socketingly disposed with two first enclosing parts, and the second end portion of the spindle is socketingly disposed with two second enclosing parts.

11. The hinge structure with changeable frictional faces as defined in claim 8, wherein the rotation range of the second enclosing part is between 170 to 190 degrees.

12. The hinge structure with changeable frictional faces as defined in claim 8, wherein the first enclosing part comprises at least two fixed holes and the second enclosing part comprises at least two fixed holes.

\* \* \* \* \*